United States Patent
Liu

(10) Patent No.: US 9,495,230 B2
(45) Date of Patent: Nov. 15, 2016

(54) TESTING METHOD

(71) Applicant: ACCTON TECHNOLOGY CORPORATION, Hsinchu (TW)

(72) Inventor: Keng-Shao Liu, Chiayi (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 818 days.

(21) Appl. No.: 13/785,315

(22) Filed: Mar. 5, 2013

(65) Prior Publication Data
US 2013/0238284 A1 Sep. 12, 2013

(30) Foreign Application Priority Data

Mar. 6, 2012 (TW) ............... 101107548 A

(51) Int. Cl.
*G21C 17/00* (2006.01)
*G06F 11/07* (2006.01)

(52) U.S. Cl.
CPC ........... *G06F 11/07* (2013.01); *G06F 11/0751* (2013.01); *G06F 11/0793* (2013.01)

(58) Field of Classification Search
CPC .......... G11C 2029/0409; G11C 29/04; G11C 29/42; G11C 29/44; G11C 29/76; G06F 11/0793; G06F 11/0775; G06F 11/3476; G06F 11/1441; G06F 11/366; G06F 9/5038
See application file for complete search history.

(56) References Cited

U.S. PATENT DOCUMENTS

| | | | |
|---|---|---|---|
| 7,571,352 B2 * | 8/2009 | Weichselbaum | G06F 11/0706 714/21 |
| 7,818,625 B2 * | 10/2010 | LeBlanc | G06F 11/2268 714/40 |
| 2006/0200702 A1 * | 9/2006 | Canning | G06F 11/0715 714/38.1 |

OTHER PUBLICATIONS

Carrozza et al., 'Operating System Support to Detect Application Hangs,', 2008, BCS Publication, pp. 1-11.*

* cited by examiner

*Primary Examiner* — Elias Desta
(74) *Attorney, Agent, or Firm* — Ming Chow; Sinorica, LLC

(57) ABSTRACT

A testing method used to check if an application executed in an operating system is crashed. The operating system is provided with a first value corresponding to the application, and the first value is stored in a storage unit. The testing method includes the following steps: send a message in a predetermined time period to the application to request a feedback from the application, and adjust the first value stored in the storage unit to another value by proceeding a predetermined algorithm; reboot the operating system if the said another value is equal to a second value; reset the said another value stored in the storage unit to the first value if the application gives the feedback.

8 Claims, 5 Drawing Sheets

TESTING METHOD

The current application claims a foreign priority to the patent application of Taiwan No. 101107548 filed on Mar. 6, 2012.

BACKGROUND

1. Technical Field

The present invention relates to a system testing, particularly to a testing method.

2. Related Art

Alone with the development of the technology, many network devices are equipped with operating systems, and with all kinds of applications carried with the operating systems, the capability and functionality of these network devices is more powerful than before.

However, once if any application is crashed due to falling into infinite loops or other reasons, the crashed application may be not able to perform its normal task, and the problem cannot be solved if the operating system did not get rebooted. Moreover, if the crashed application is used to provide certain important service, the usability of network may be influenced.

BRIEF SUMMARY

The present invention provides a testing method, which can automatically reboot the operating system if any application stops working.

The testing method is used to check whether an application executed in the operation system is crashed, wherein a first value stored in a storage unit is corresponding to the application. The testing method comprises the steps of:

a. Send a message in a predetermined time period to the application to request a feedback from the application, and adjust the first value stored in the storage unit to another value by proceeding a predetermined algorithm;
b. Reboot the operating system if the said another value is equal to a second value; and
c. Reset the said another value stored in the storage unit to the first value if the application gives the feedback.

Preferably, the message in the step a is an event message of the operating system.

Preferably, a system timer is used in the step a to generate a time-counting signal in the predetermined time period to enable sending the message to the application.

Preferably, the first value stored in the storage unit is adjusted to the said another value by adding or subtracting a predetermined number to the first value in the storage unit in the step a.

Preferably, the step b further records a system reboot log corresponding to the application while rebooting the operating system.

Preferably, the said another value in the storage unit is reset to the first value by the application in the step c.

Preferably, the application sends a response signal as the feedback in the step c.

Preferably, the step c further includes returning to the step a and going through to the step c if the application does not give the feedback.

By the design disclosed above, once if any application executed in the operating system is crashed, the operating system can be rebooted timely.

DETAILED DESCRIPTION

Figure 1:
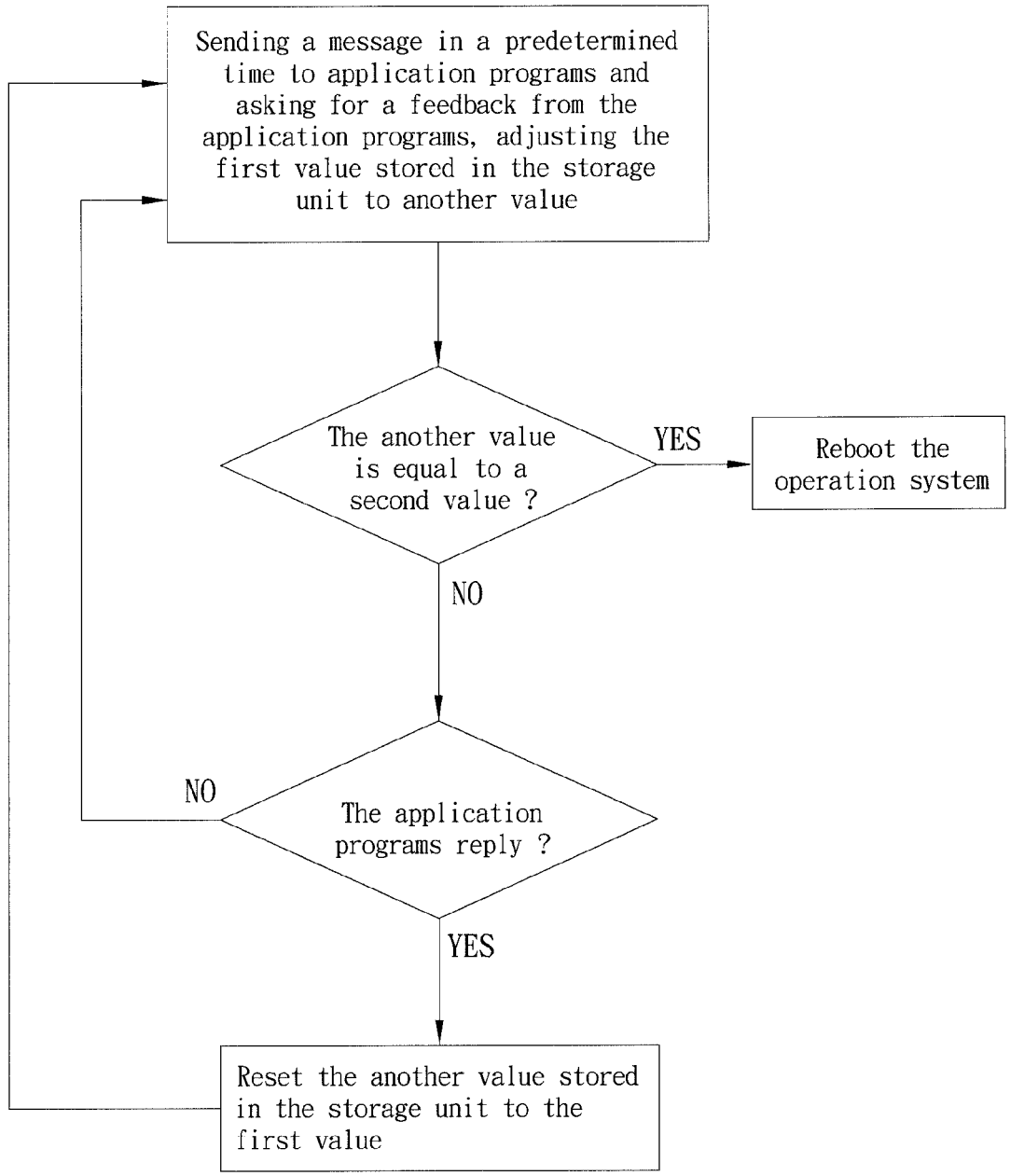
FIG. 1 is a preferred embodiment of the testing method flow chart in accordance with the present invention.
Figure 2:
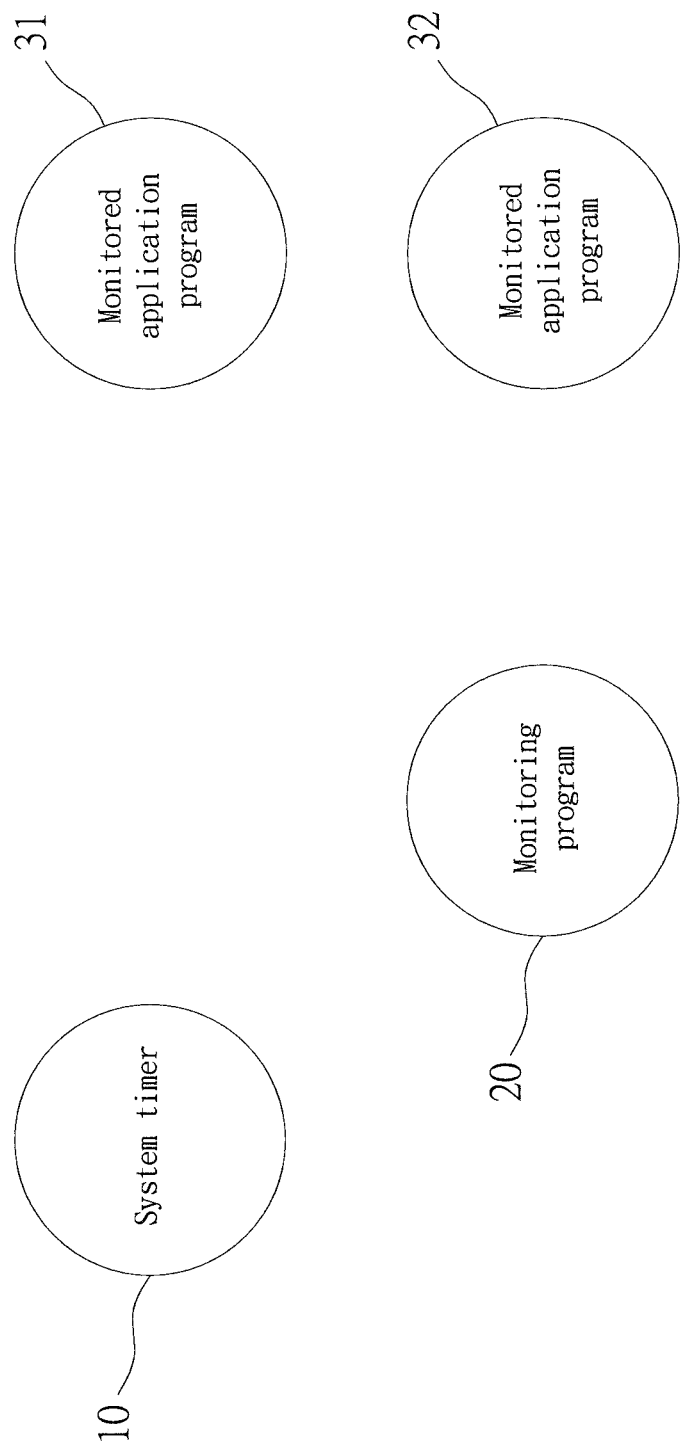
FIG. 2 is a system structure diagram of the testing method in accordance with the present invention.

Please refer to FIG. 1, which is a preferred embodiment of the testing method flow chart in accordance with the present invention. Please also refer to FIG. 2, which is a system structure diagram of the testing method in accordance with the present invention. The preferred embodiment is illustrated by an operating system installed in a network device, and the operating system can be Linux operating system, but not limited thereto. The operating system includes a system timer 10, a monitoring program 20 and a plurality of monitored applications 31 and 32. The system timer 10 can generate a time-counting signal in a predetermined time period. The monitoring program 20 has several first values which correspond to each monitored application 31 and 32, and the several first values are stored in a storage unit (memory, buffer, etc.). The monitored application 31 and 32 provide specific functions, such as user interface, network address translation, or packets forwarding, but not limited thereto. The monitored application 31 and 32 can be any application executed in the operating system. Besides, the first values can be set as any value within the absolute value of the differences with a second value, thereby providing different time periods to reboot the operating system for each crashed application. In other words, each application has different reboot waiting time after crashing, depending on the importance of the application. In the present embodiment, the first value is set as 10, but not limited thereto.

Figure 3:
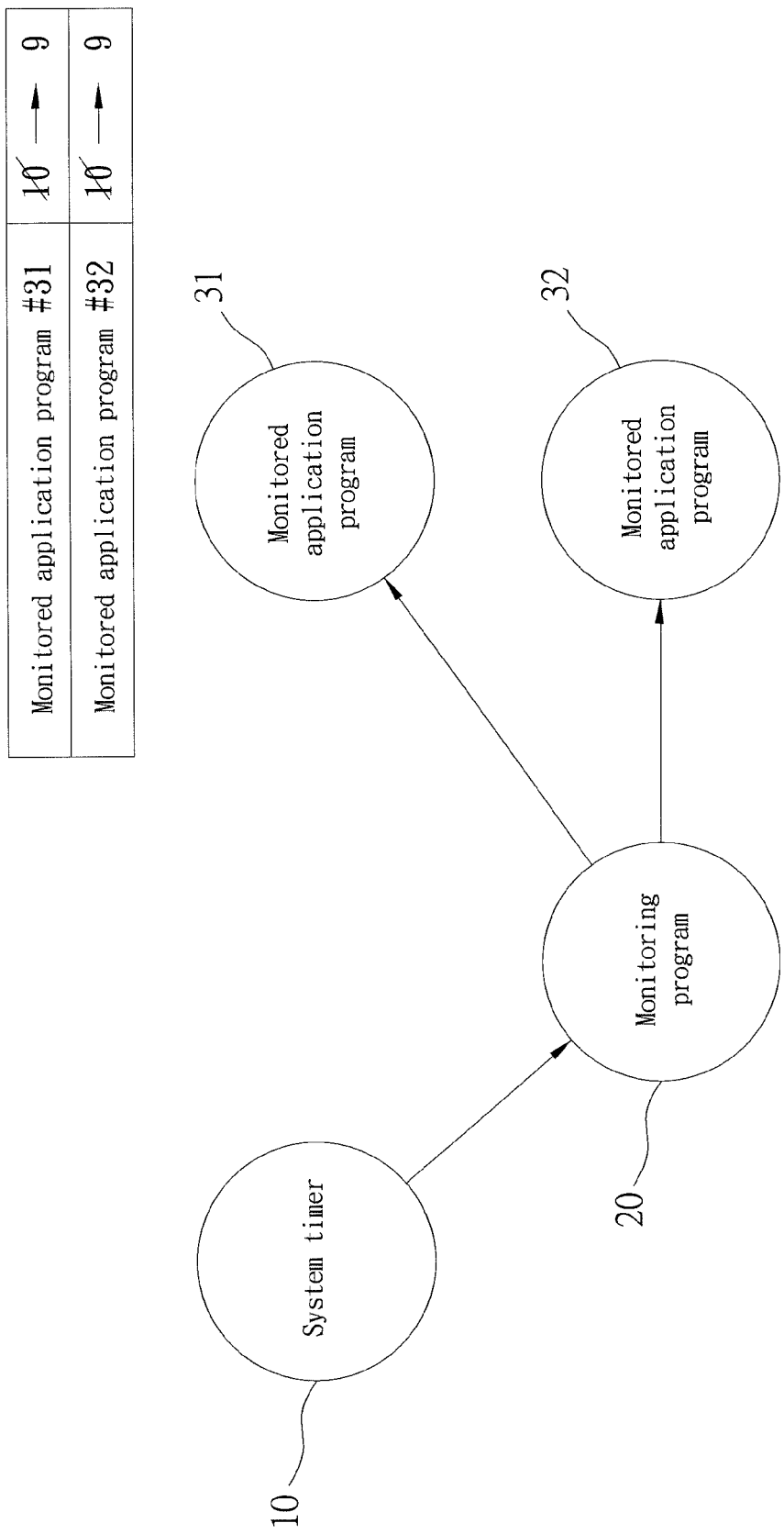
FIG. 3 illustrates the step a of the preferred embodiment of the testing method in accordance with the present invention.
Figure 4:
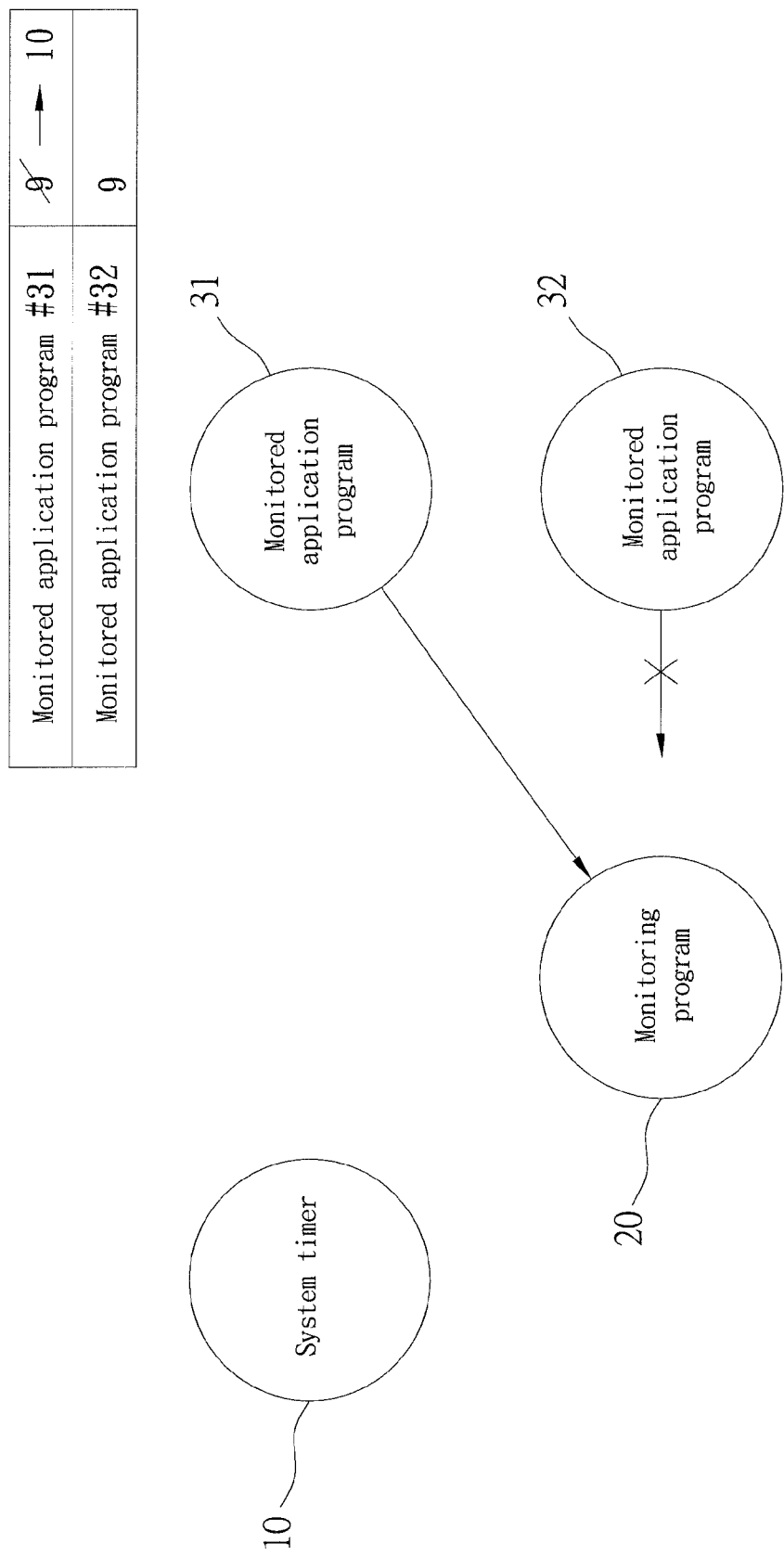
FIG. 4 illustrates the step c of the preferred embodiment of the testing method in accordance with the present invention.
Figure 5:
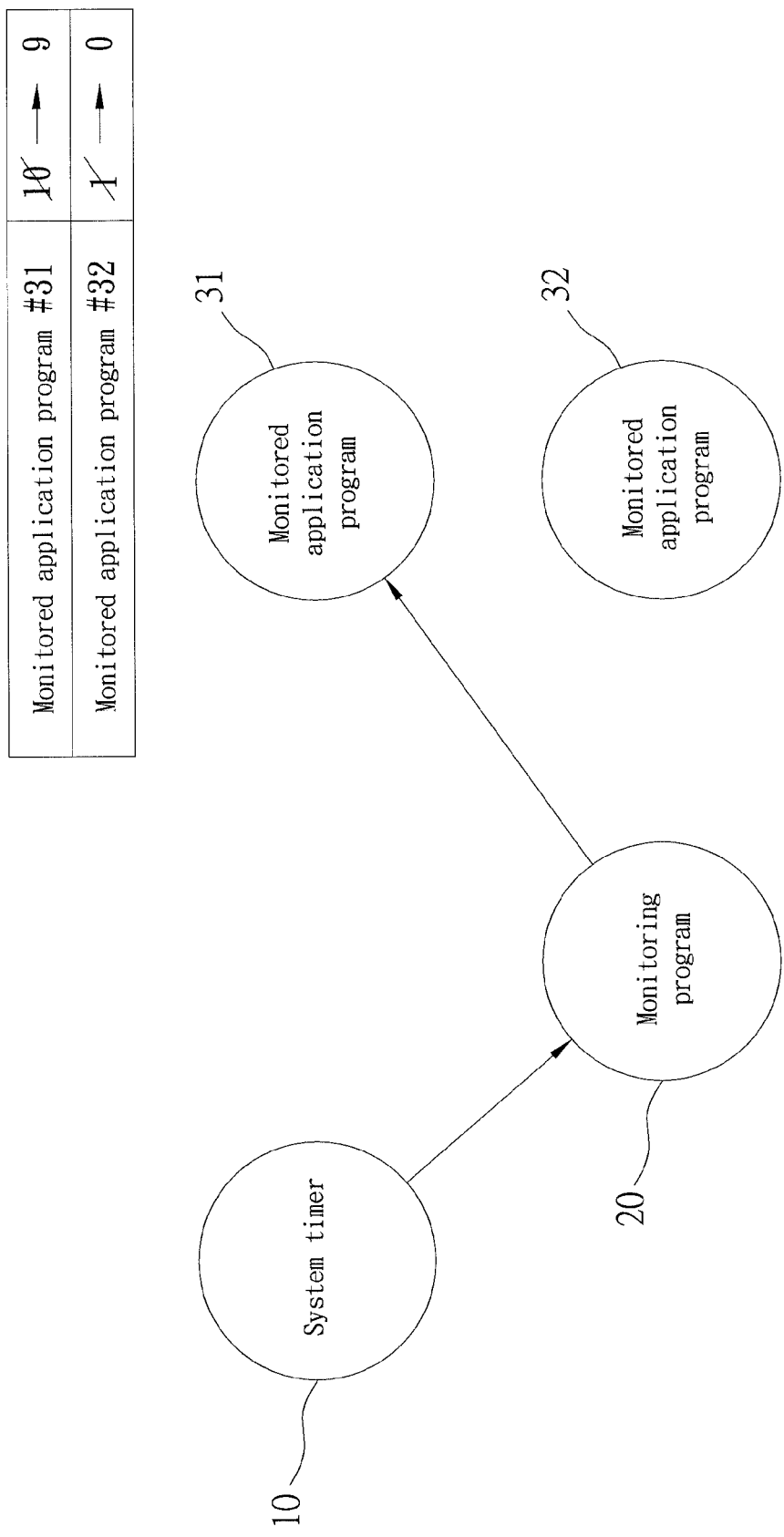
FIG. 5 shows the application of the operating system has been identified as crashed.

Please refer to FIG. 3 to FIG. 5, when the operating system begins to work, the monitoring program 20 can check whether the monitored application 31 and 32 are crashed by the testing method based on the embodiment of the present invention. The testing method of the embodiment in accordance with the present invention includes the following steps:

a. Send a message in a predetermined time period to the application to request a feedback, and adjust the first value stored in the storage unit to another value by processing a predetermined algorithm.

In this step, the system timer 10 generates a time-counting signal in a predetermined time period, and the monitoring program 20 sends a message to each of the monitored application 31 and 32 within a predetermined time period according to the time-counting signal generated by the system timer 10, and request the feedback from each of the monitored application 31 and 32, which receives the message sent by the monitoring program 20. The monitoring program 20 will also adjust the first value stored in the storage unit to another value after sending the message to each monitored application 31 and 32. In the present embodiment, the predetermined time period can be set as any value by demand, such as 1 minute. The message can be an event message of the operating system. While the monitored applications 31 and 32 are under normal working state, once they have received the event message which requests the feedback, they will send a feedback message respectively, and the feedback message will make the monitoring programs 20 subtract a predetermined value from the first value, and therefore the first value will be adjusted into another value. The predetermined value can be any number, which is set as 1 in the preferred embodiment. Please refer to FIG. 3, when the monitoring program 20 sends the message, the second value 9 corresponding to each monitored application 31 and 32 can be obtained by subtracting the predetermined value from the first value. In another embodiment, when the application receives the message and sends the feedback message to the monitoring program 20, the said another value stored in the storage unit will be adjusted to the first value. Besides, the aforementioned predetermined algorithm could be an algorithm that the predetermined value are added to the first value to adjust the first value to the said another value in another embodiment.

b. Detect if the said another data is equal to the second data.

If the said another value is equal to the second value, the operating system will be rebooted. In the present step, the monitoring program 20 compares the said another value obtained at step a to the second value. If the said another value is equal to the second value, the monitoring program 20 will send a signal to reboot the operating system. The second value is set to a different value according to the predetermined algorithm. If the predetermined algorithm is to add the predetermined value to the first value, the second value should be larger than the first value stored in the storage unit. On the contrary, if the predetermined algorithm is to subtract the predetermined value from the first value, the second value should be smaller than the first value. In the present invention, the second value is 0. Therefore, when the first value is adjusted to 0 with the predetermined algorithm, the monitoring program 20 will send the signal to make the operating system reboot, reset or warm start, but the actions taken by the operating system are not limited thereto. In another embodiment of the present invention, when the operation system reboots, the monitoring program 20 will record a system reboot log and thereby provides useful information about the most frequently crashed application to the user or the maintenance engineer for the purpose to maintain the operating system.

c. Detect if the monitored application 31 and 32 give the feedback.

The said another value stored in the storage unit is reset to the first value if the monitored application 31 and 32 give the feedback, then returning to the step a, and going through to the step c; if any one of the monitored application 31 and 32 does not give the feedback, then returning to the step a, and going through to the step c immediately. In the present step, the monitoring program 20 detects the feedback of the monitored application 31 and 32 by seeing if the monitoring program 20 has received the response message from the monitored application 31 and 32. After receiving the response message from the monitored application 31 and 32, the monitoring program 20 will reset the said another value back to the first value. On the contrary, if any one of the monitored application 31 and 32 does not give the feedback in the predetermined time period, the monitoring program 20 will return to the step a, and go through to the step c. Please refer to FIG. 4, the monitoring program 20 has received the response message from the monitored application 31, the said another value corresponding to the monitored application 31 will be reset back to 10, and then the monitoring program 20 will continue executing the step a to the step c. The monitoring program 20 does not receive the response message from the monitored application 32, therefore for the monitored application 32, the monitoring program 20 will immediately return to the step a, and go through to the step c again.

Please refer to FIG. 5, by the steps described above, if the monitored application 32 still not give the feedback, the monitoring program 20 will keep adjusting the first value corresponding to the monitored application 32, and once the adjusted value is equal to the second value, the monitoring program 20 will deem the monitored application 32 as crashed, and thereby reboot the operating system to make the monitored application 32 back to normal work again.

For those described above, the embodiment of the present invention can reboot the operating system in a predetermined time period according to different application functions once if the applications are crashed. By this way, the unwanted condition can be fixed timely, and the operating system can be rebooted without waiting for the processor unit to overload, thereby minimizing the impact to the working of those network devices with operating systems due to crashes of any important application.

What is claimed is:

1. A testing method used to check a crashed application, the testing method comprising steps of:
   a. Providing a network device and a storage unit;
   b. Installing an operating system in the network device, installing an application in the operating system, and storing a first value, an another value and a second value in the storage unit;
   c. Sending a message to the application to request a response from the application, and adjusting the first value to the another value other than the first value by proceeding a predetermined algorithm each time a predetermined time period passes; wherein the predetermined algorithm adjusts the first value to the another value in a manner of gradually approaching the second value, which is different from the first value; wherein a margin between the first value and the second value depends on a predetermined importance of the application; and
   d. Rebooting the operating system once the another value is equal to the second value, for the application is deemed crashed; or alternatively, resetting the another value back to the first value once the application gives the response, for the application is deemed not crashed.

2. The testing method according to claim 1, wherein the message in the step c is an event message of the operating system.

3. The testing method according to claim 1, wherein a system timer is used in the step c to generate a time-counting signal in the predetermined time period to enable sending the message to the application.

4. The testing method according to claim 1, wherein the first value is adjusted to the another value by adding or subtracting a predetermined number to the first value in the step c.

5. The testing method according to claim 1, wherein the step d further includes recording a system reboot log corresponding to the application while the operating system is being rebooted.

6. The testing method according to claim 1, wherein the another value is reset to the first value by the application in the step d.

7. A testing method used to check a crashed application, the testing method comprising the steps of:
   a. Providing a network device and a storage unit;

b. Installing an operating system in the network device, installing an application in the operating system, and storing a first value, an another value and a second value in the storage unit;

c. Sending a message to the application to request a response from the application, and adjusting the first value to the another value other than the first value by adding or subtracting a predetermined number to the first value each time a predetermined time period passes; wherein the first value is adjusted to the another value, whether by adding or subtracting the predetermined number thereto, in a manner of gradually approaching the second value, which is different from the first value; wherein a margin between the first value and the second value depends on a predetermined importance of the application; and d. Rebooting the operating system once the another value is equal to the second value, for the application is deemed crashed; or alternatively, resetting the another value back to the first value once the application gives the response, for the application is deemed not crashed.

8. The testing method according to claim 7, wherein the step d further includes recording a system reboot log corresponding to the application while the operating system is being rebooted.

* * * * *